United States Patent
Jayaraman

(10) Patent No.: US 9,924,487 B2
(45) Date of Patent: Mar. 20, 2018

(54) METHOD AND SYSTEM FOR CONCEALING LOCATION INFORMATION OF A USER

(71) Applicant: Wipro Limited, Bangalore (IN)

(72) Inventor: Venkata Subramanian Jayaraman, Chennai (IN)

(73) Assignee: WIPRO LIMITED, Bangalore (IN)

( * ) Notice: Subject to any disclaimer, the term of this patent is extended or adjusted under 35 U.S.C. 154(b) by 262 days.

(21) Appl. No.: 14/887,728

(22) Filed: Oct. 20, 2015

(65) Prior Publication Data
US 2017/0064664 A1    Mar. 2, 2017

(30) Foreign Application Priority Data
Aug. 24, 2015    (IN) .......................... 4418/CHE/2015

(51) Int. Cl.
| | |
|---|---|
| *H04W 64/00* | (2009.01) |
| *H04W 12/02* | (2009.01) |
| *H04W 4/02* | (2018.01) |
| *H04W 8/16* | (2009.01) |

(52) U.S. Cl.
CPC ............. *H04W 64/00* (2013.01); *H04W 4/02* (2013.01); *H04W 8/16* (2013.01); *H04W 12/02* (2013.01)

(58) Field of Classification Search
CPC ........ H04W 64/00; H04W 4/02; H04W 12/02
USPC ........ 455/456.1, 456.2, 456.3; 370/352, 389, 370/493
See application file for complete search history.

(56) References Cited

U.S. PATENT DOCUMENTS

| | | | |
|---|---|---|---|
| 5,649,301 A | 7/1997 | Yabusaki et al. | |
| 8,200,216 B2 | 6/2012 | Noldus | |
| 8,565,780 B2 | 10/2013 | Soelberg et al. | |
| 8,613,109 B2 | 12/2013 | Janoulis et al. | |
| 8,811,939 B2 | 8/2014 | Edge et al. | |
| 8,989,778 B2 | 3/2015 | Altman et al. | |
| 2012/0042390 A1 | 2/2012 | Iwuchukwu | |

*Primary Examiner* — Sam Bhattacharya
(74) *Attorney, Agent, or Firm* — Finnegan, Henderson, Farabow, Garrett & Dunner LLP

(57) ABSTRACT

The present disclosure relates to a method for concealing location information of a user. The method comprises receiving current location information of a mobile terminal associated with the user from a network server upon initiation of a call by telecom equipment with the mobile terminal. The mobile terminal is registered with the network server. The method further comprises retrieving privacy settings of the mobile terminal predefined in respect to the telecom equipment when the current location information of the mobile terminal is different from location information associated with the network server. The method further comprises routing the call to the network server for announcing pre-stored information in a predefined language to the telecom equipment based on the retrieved privacy settings for concealing the current location information of the user.

21 Claims, 8 Drawing Sheets

METHOD AND SYSTEM FOR CONCEALING LOCATION INFORMATION OF A USER

PRIORITY CLAIM

This U.S. patent application claims priority under 35 U.S.C. § 119 to India Application No. 4418/CHE/2015, filed Aug. 24, 2015. The entire contents of the aforementioned application are incorporated herein by reference.

TECHNICAL FIELD

The present subject matter is related, in general to communication network systems, and more particularly, but not exclusively to an information protection server and method for concealing location information of a user.

BACKGROUND

In general, a mobile terminal is registered with a Mobile Switching Centre (MSC) which is associated to a Home Location Register (HLR) and a Visitor Location Register (VLR). The MSC is responsible for providing end-to-end connection including routing calls and messages and the like call related services between the registered mobile terminal and other mobile terminals and/or other telecom devices. The MSC is associated with predefined location from which location of the registered mobile terminal is identified based on which particular mobile related services are rendered by the MSC to the registered mobile terminal. When the mobile terminal is present within the registered network, then the mobile terminal is considered to be in home location/network. In such a case, the mobile terminal is authorized to receive mobile related services as per subscriber plan contained in the HLR. As and when the mobile terminal moves out of the predefined location of the MSC, then the mobile terminal is considered to be in visitor's location i.e. the mobile terminal is in other MSC of a network. In such a case, the mobile terminal is rendered with mobile related services as per subscriber roaming plan contained in the VLR of the other MSC. Each MSC is configured with a recorded server and/or media server which are configured to play announcements in a preconfigured language during certain scenarios. FIG. 1 shows a conventional method illustrating hiding of location information of a called party. Considering, user 1 is a called party and user 2 is a calling party calling the user 1. Assuming, the user 1 is using a mobile terminal 1 which is registered with network 1 having MSC 1 and HLR 1/VLR 1. Now, assuming, user 2 tries to reach user 1 who is busy or not reachable due to network disconnection. In such a case, user 2 receives an announcement from network 1 i.e. from MSC 1. Considering, user 1 is roaming and is registered with network 2 having MSC 2 and HLR 2/VLR 2. Then, user 2 receives announcements from network 2 i.e. MSC 2 when user 2 tries to reach user 1. For example, the announcement is received in "First" language by mobile terminal 2 from the network 1 which is preconfigured with "First" language.

In a scenario, considering the mobile terminal 1 is in visitor's location (roaming) and is originally associated to the MSC 1. Consider, a MSC 2 in the visitor's location is connected to the mobile terminal 1. Now, assuming, other mobile terminal 2 tries to reach to the mobile terminal 1 and considering the mobile terminal 1 is busy with other calls and/or not reachable to the other mobile terminal 2. In such a scenario, the MSC 1 of the mobile terminal 1 reroutes the call of the other mobile terminal 2 to the recorded server and/or the media server of the MSC 2. Then, the recorded server and/or the media server plays an announcement to the other mobile terminal 2 in a language as preconfigured with the MSC 2. For example, considering the announcement recorded in the recorded server and/or the media server of the MSC 2 is in "Second" language. Then, the announcement is played in "Second" language to the other mobile terminal 2 by the recorded server and/or media server of the MSC 2 associated to the mobile terminal 1 while roaming. In such a way, the location of a user of the mobile terminal 1 is identifiable by user of the other mobile terminal 2. That is, user of the other mobile terminal 2 identifies that the user of the mobile terminal 1 is outside the state/original location and/or nation.

In one conventional method, location of the user of the mobile terminal is identifiable from the language of the announcement being played. In other words, any person can know location of the user just by calling the user. In such a case, probability to identify location of the user is high. Further, any person can intrude to privacy of the user even when the user does not intend to disclose the location information to other persons.

In one conventional method, an intelligent network is configured with Service Switching Point (SSP) and/or Service Control Point (SCP) which are used to connect to a language database. The SSP and/or the SCP determine calling party and provides announcement in a preferred language thereby hiding location information of called party. However, the conventional method does not enable the called party to determine what kind of announcement the calling party must receive. The conventional method provides the announcement in a language preferable to the calling party instead of the called party whose privacy i.e. location is required to be hidden. The connection with corresponding network is set up by SSP and/or SCP whereas rerouting number in respect of the called party is still visible to the calling party. In such a way, privacy of the called party is always intruded/compromised and is never been secured from being revealed.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

In one embodiment, the present disclosure relates to a method for concealing location information of a user. The method comprises receiving current location information of a mobile terminal associated with the user from a network server upon initiation of a call by telecom equipment with the mobile terminal. The mobile terminal is registered with the network server. The method further comprises retrieving privacy settings of the mobile terminal predefined in respect to the telecom equipment when the current location information of the mobile terminal is different from location information associated with the network server. The method further comprises routing the call to the network server for announcing pre-stored information in a predefined language to the telecom equipment based on the retrieved privacy settings for concealing the current location information of the user.

In another embodiment, the present disclosure relates to an information protection server for concealing location information of a user. The information protection server further comprises a processor and a memory communicatively coupled to the processor, wherein the memory stores processor-executable instructions, which, on execution, cause the processor to perform operations to receive current location information of a mobile terminal associated with the user from a network server upon initiation of a call by a telecom equipment with the mobile terminal. The mobile terminal is registered with the network server. The processor is further configured to retrieve privacy settings of the mobile terminal predefined in respect to the telecom equipment when the current location information of the mobile terminal is different from location information associated with the network server. The processor is further configured to route the call to the network server for announcing pre-stored information in a predefined language to the telecom equipment based on the retrieved privacy settings for concealing the current location information of the user.

In another embodiment, the present disclosure relates to a non-transitory computer readable medium including instructions stored thereon that when processed by at least one processor causes an information protection server requirement enhancing system for concealing location information of a user to perform the act of receiving current location information of a mobile terminal associated with the user from a network server upon initiation of a call by a telecom equipment with the mobile terminal. The mobile terminal is registered with the network server. The medium further comprises retrieving privacy settings of the mobile terminal predefined in respect to the telecom equipment when the current location information of the mobile terminal is different from location information associated with the network server. The medium further comprises routing the call to the network server for announcing pre-stored information in a predefined language to the telecom equipment based on the retrieved privacy settings for concealing the current location information of the user.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
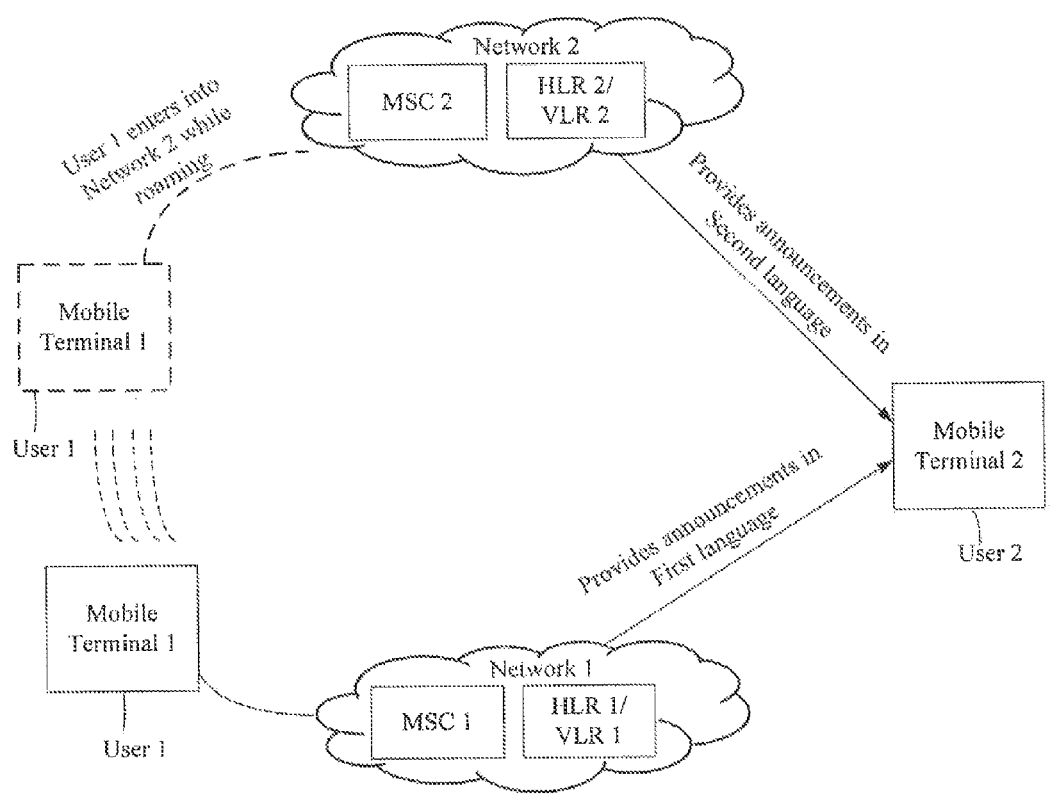
FIG. 1 shows conventional scenario for hiding location information of a called party.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and an information protection server for concealing location information of a user. Particularly, the location information of a called party is concealed from being revealed to a calling party. Embodiments of the present disclosure conceal the location information of a called party by announcing pre-stored information in a language that is preconfigured with a network server with which the called party is registered. For example, busy state of the called party and/or non-reachable state of the called party, are announced in the language preconfigured with the network server of the called party. The called party can be present in any location, i.e. outside state and/or outside nation, that is out-of-bound of the network server to which the called party is registered. In any such scenarios of the called party being in any locations, the announcements are played in the language preconfigured with the network server only. More specifically, current location information of the called party, when present out-of-bound of the network server is never revealed to any calling party. In such cases, the calling party may believe that the called party is within the state and/or within the nation only and the called party is not moved to any other location. In such a way, any calling party is prevented to identify or determine private information i.e. current location information of the called party. Also, in such a way, any calling party is prevented to intrude into privacy of the called party.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 2A:
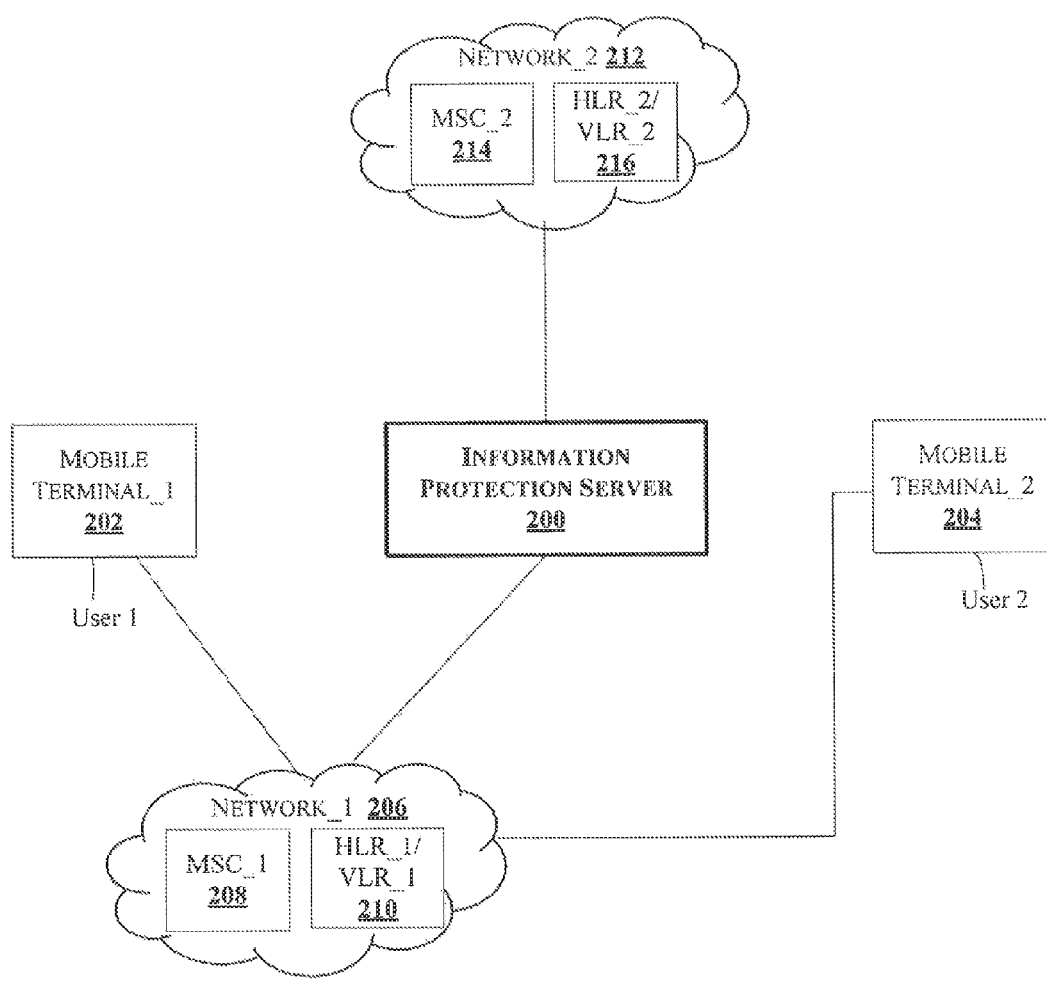
FIGS. 2a and 2b illustrate an exemplary scenario of concealing location information of a called party in accordance with some embodiments of the present disclosure.

Embodiments of the present disclosure disclose a method for concealing the location information of a user i.e. of a called party. The information protection server is used as a medium between one network server associated with called party and other network servers associated with calling parties to conceal the location information of the user to the calling party. The information protection server is connected between network servers. FIG. 2a shows the exemplary arrangement of the information protection server 200 with the network servers which are named as network_1 206 and network_2 212. Each network server comprises Mobile Switching Centre (MSC) (208, 214), and Home Location Register (HLR) and/or Visitor Location Register (210, 216). The network server i.e. network_1 206 comprises MSC_1 208 and HLR_1/VLR_1 210 and the network server i.e. network_2 212 comprises MSC_2 214 and HLR_2/VLR_2 216. The MSC (208, 214) is responsible for providing end-to-end connection between the user alternatively referred as called party and the calling party. The HLR/VLR (210, 216) contains information of mobile device and/or telecom equipment which are authorized to use mobile network within boundary or out-of-bound of the corresponding MSC (208, 214). Each network server i.e. network_1 206 and network_2 212 is preconfigured with certain location boundary and language in which the announcements are provided to any calling party. Considering, user 2 is a calling party trying to reach user 1 who is a called party i.e. user 2 is trying to call the user 1. The user 2 uses mobile terminal_2 204 to call mobile terminal_1 202 of the user 1 and assuming the mobile terminal_1 of the user 1 is registered with network_1 206. The call from the user 2 is routed by the MSC_1 208 to the mobile terminal_1 202. In normal scenario, considering the user 1 is present within the location boundary i.e. home location of the MSC_1 208. Consider, the network_1 206 and the MSC_1 208 along with HLR/VLR 210 are associated with "First" state. Now, assuming, the user 1 is busy in call with other calling party (other than user 2) or user 1 is not reachable for call by the user 2. In such a case, the MSC_1 208 provides announcements in the language which is preconfigured with the MSC_1 208. For example, consider announcement in the MSC_1 208 is preconfigured with "First" language. Then, the MSC_1 208 provides announcements in "First" language to the user 2 when the user 1 is busy in other call or is not reachable by the user 2.

Figure 2B:
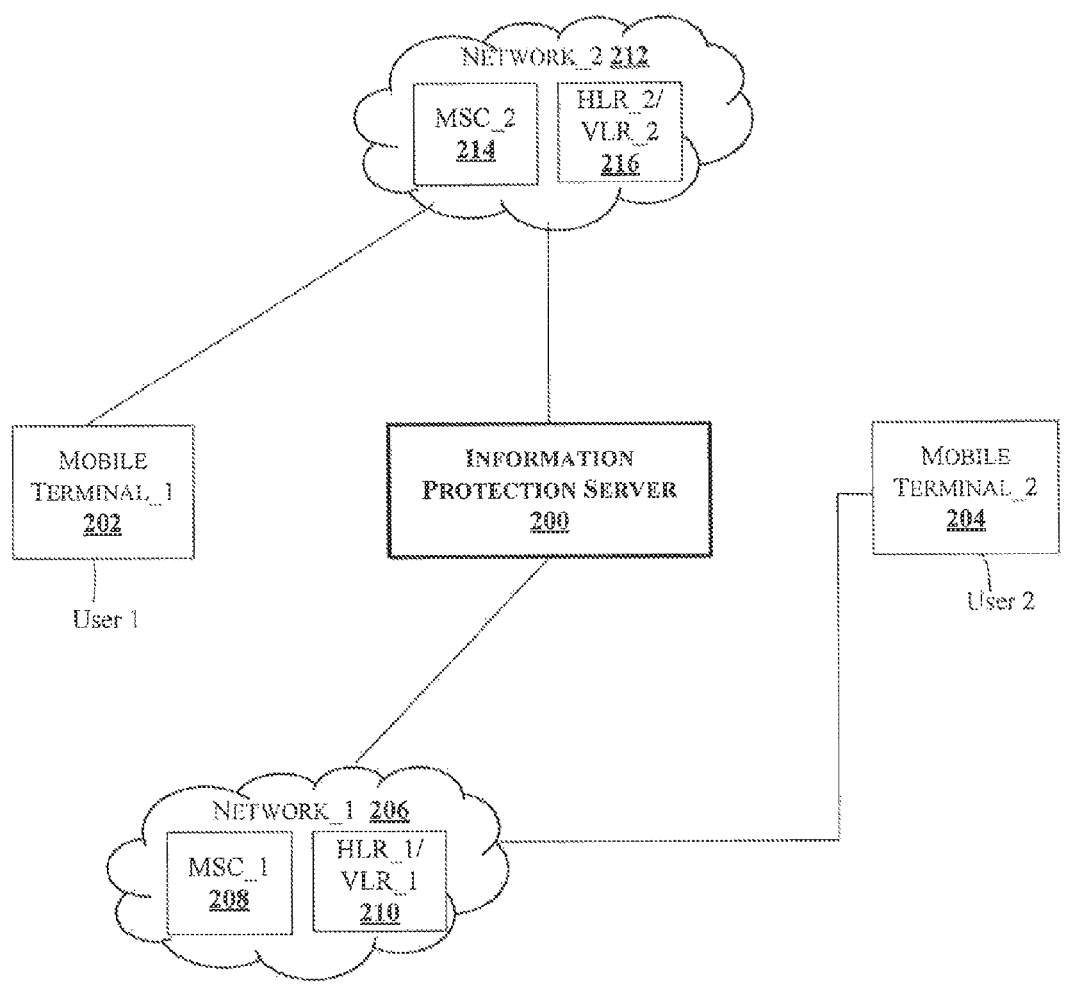

Now, consider the user 1 moves or is in roaming that makes the mobile terminal_1 202 out-of-bound of the MSC_1 208. Assuming, the mobile terminal_1 202 of the user 1 enter in boundary of network_2 212 i.e. in network_2 212 as shown in FIG. 2b. Consider, the network_2 212, the MSC_2 214 along with HLR/VLR 216 are associated with "Second" state. In such a case, assuming, the user 2 calls the user 1 who is busy in other calls or is not reachable to the user 2. Then, current location information of the mobile terminal_1 202 of the user 1 is received by the information protection server 200 from MSC_2 214 of the network_2 212. The MSC_2 214 informs the information protection server 200 in relation to the current location information of the user 1 that the user 1 is in roaming and is present in location boundary of the network_2 212. Then, after receiving the current location information of the mobile terminal_1 202 of the user 1, the information protection server 200 checks whether user 1 has configured any privacy settings for the user 2. That is, the information protection server 200 checks whether user 1 has preconfigured to reveal the current location information of the user 1 to user 2 or to conceal the current location information of the user 1 to user 2. Considering, the user 1 has preconfigured the privacy settings for user 2 to conceal the current location information of the user 1 to user 2. In such a case, the information protection server 200 retrieves the privacy settings of the user 1 in respect to the mobile terminal_2 204 of the user 2 when the user 1 is in the roaming i.e. current location information is different from location information associated with the network_1 206. Then, the information protection server 200 routes the call received from the user 2 from the network_2 212 back to the network_1 206. In such a way, the network_1 206 announces the busy state or not reachable state of the user 1 in "First" language only to the user 2. Thus, user 2 is not enabled to identify or determine the privacy information of the user 1 or the current location of the user 1. Hence, the privacy of the user 1 is concealed from being revealed to the user 2 or any calling party unlike the conventional methods.

Figure 3:
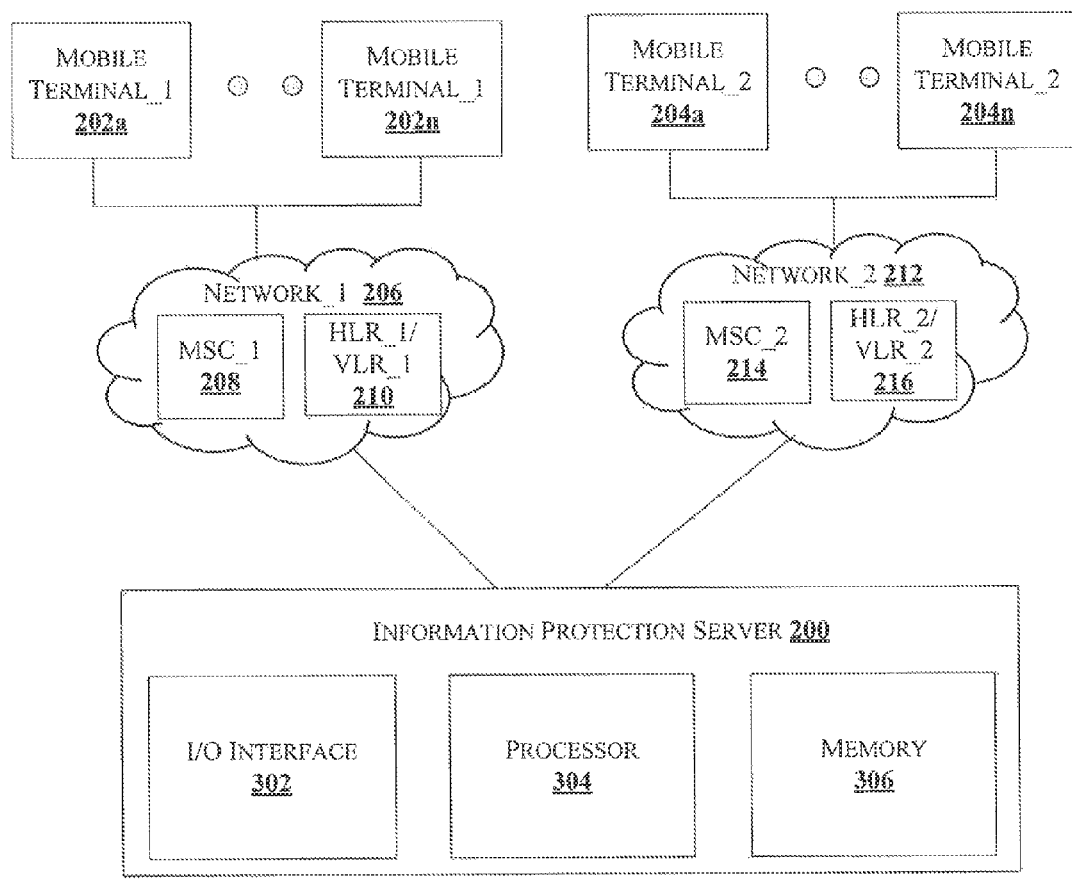
FIG. 3 illustrates an exemplary embodiment of environment for concealing location information of a called party in accordance with some embodiments of the present disclosure.

FIG. 3 illustrates an exemplary embodiment of environment for concealing location information of a user in accordance with some embodiments of the present disclosure.

The environment comprises the information protection server 200, network servers i.e. network_1 206 and network_2 212 and mobile terminals i.e. mobile terminal_1 202 and mobile terminal_2 204. In one implementation, the information protection server 200 may be implemented in a variety of computing systems, such as a laptop computer, a desktop computer, a Personal Computer (PC), a notebook, a node in a network, a server, a network server, and the like. In one example, the information protection server 200 is configured to conceal the location information of the user i.e. of a called party. The components of the information protection server 200 are explained in detail below sections of the description.

In an embodiment, the information protection server 200 is communicatively connected to one or more network servers named as network_1 206 and network_2 208 over a network. In the illustrated FIG. 3, the one or more network servers are the network_1 206 and the network_2 208. Each network server i.e. the network_1 206 and the network_2 208 comprises Mobile Switching Centre (MSC), Home Location Register (HLR) and Visitor Location Register (VLR). Particularly, the network server i.e. the network_1 206 comprises MSC_1 208 and HLR_1/VLR_1 210. The network server i.e. the network_2 212 comprises MSC_2 214 and HLR_2/VLR_2 216. The functioning and operations performed by the network servers and associated MSCs (MSC_1 208, MSC_2 214) and HLRs/VLRs (HLR_1/VLR_1 210, HLR_2/VLR_2 216) are explained in below description. In an embodiment, 'n' number of mobile terminals may be registered with each network server. The mobile terminals 202a, . . . , 202n (collectively referred as 202) may be registered with the network server i.e. the network_1 206 and the mobile terminals 204a, . . . , 204n (collectively referred as 204) may be registered with the network server i.e. the network_2 212. In an embodiment, the mobile terminals (202, 204) include, without limitations, mobile phones, smartphones, telephone, telecom equipment, wired phones, cordless phones and the like which functions for calling and receiving the calls.

In one implementation, the network servers are servers that facilitate mobile related services between mobile terminals and/or any telecom equipment. In an embodiment, the mobile related services include, without limitations, call facilities, messages facilities, application facilities, Short Message Service (SMS) facilities, FAX, circuit switched data, and other mobile communications and/or telecom communications. In an embodiment, the one or more network servers may facilitate Public Switched Telephone Network (PSTN) as well for telephone calls and/or telecom communications. Each network server is preconfigured with location boundary which defines home network and visitor network (i.e. roaming) for the mobile terminal.

The MSC is a primary service delivery node for Global System for Mobile communications (GSM) or Code Division Multiple Access (CDMA). Also, the MSC is a primary element which controls various network switching subsystem elements or GSM core network. Typically, the MSC is responsible for various mobile communications and/or telecom services which include, without limitations, routing voice calls, SMSs, conference calls etc. The MSC sets up and releases end-to-end connections between mobile terminals and/or telecom equipment. Further, the MSC manages charging state of the mobile terminals and/or the telecom equipment and monitors real-time pre-paid account information of each mobile and/or each telecom equipment.

The HLR defines the location information of the mobile terminal to be in home network. Particularly, considering, the mobile terminal is present within the location boundary preconfigured for the mobile terminal. In such a case, the mobile terminal is in the home network i.e. connected to the MSC of the corresponding network server that is originally registered with the mobile terminal. For example, considering the network server and corresponding MSC is preconfigured for "First" state. The mobile terminal is considered to be in home network when the mobile terminal is within the "First" state. In one implementation, the HLR is a central database that contains details of each mobile terminal and/or telecom equipment which is authorized to use the GSM core network or CDMA services. In such a case, the HLR stores Subscriber Identity Module (SIM) card information of each user and/or of each mobile terminal. Each SIM comprises a unique identifier called International Mobile Subscriber Identity (IMSI) which is a primary key to each HLR record. The HLR stores profile information of each user associated with the corresponding SIM and/or the mobile terminal.

The VLR defines the location of the mobile terminal to be in visitor network. Particularly, considering, the mobile terminal is present outside or out-of-bound of the location boundary preconfigured for the mobile terminal. Now, considering, the mobile terminal is in roaming state which comes in connection with other network server and other MSC of the corresponding other network server. In such a case, the mobile terminal is in the visitor network i.e. connected to the other MSC of the corresponding other network server that is in connection in roaming state of the mobile terminal. For example, considering the network server and corresponding MSC is preconfigured for "First" state. The mobile terminal moves and is in roaming state which enters "Second" state. Now, the mobile terminal is considered to be in visitor network when the mobile terminal is in the "Second" state. In one implementation, the VLR is a database of each users associated with the mobile terminals who is in roaming state into jurisdiction of other MSCs and corresponding network server. The VLR stores such data as received from the HLR or received from mobile terminal. In an embodiment, whenever an MSC detects a new mobile terminal in the network server, a new record in the VLR is created. Also, accordingly, the HLR of the mobile terminal is updated.

In an embodiment, each network server comprises announcement player server (not shown) or media server (not shown) which is configured to play or announce pre-stored information to any mobile terminal based on various scenarios. Such announcement player server or the media server contains audio files which are played to the mobile terminals. In an embodiment, the announcements are played based on current location information of the user of the mobile terminal. The pre-stored information comprises information relating to busy state of the mobile terminal on other calls or not reachable state of the mobile terminal.

Referring back to FIG. 3, the information protection server 200 comprises an I/O interface 302, a central processing unit ("CPU" or "processor") 304 having one or more processing units, and a memory 306 in accordance with some embodiments of the present disclosure.

The I/O interface 302 is a medium through which current location information of the mobile terminal is received from the network server upon initiation of the call by the telecom equipment with the mobile terminal. For example, considering the mobile terminal_1 202 is associated with user 1 and the telecom equipment can be mobile terminal_2 204 that is associated with user 2. Now, considering, user 2 is calling user 1 who is busy or is not reachable. Further, assuming, the mobile terminal_1 202 is roaming and is present within visitor network, say, network_2 212 that is associated with "Second" state. In such a case, the current location information of the mobile terminal_1 202 associated with user 1 is received from network_2 212 through I/O interface 302 of the information protection server 200. The I/O interface 302 is configured to route the call to the network server for announcing the pre-stored information in the predefined language to the telecom equipment based on the retrieved privacy settings for concealing the current location information of the user. For example, the call from user 2 is routed through the I/O interface 302 back to home network of mobile terminal_1 202 which is network_1 206 so that the network_1 206 announces the pre-stored information i.e. busy state of the mobile terminal_1 202 in "First" language which is configured with the network_1 206. The I/O interface 302 is coupled with the processor 304. The processor 304 is configured to conceal the current location information of the user from being revealed to any calling party.

The processor 304 may comprise at least one data processor for executing program components for processing server-generated privacy settings and routing of the call to the network server. The processor 304 is configured to retrieve privacy settings of the mobile terminal which are predefined in respect to the telecom equipment (i.e. associated to calling party). The privacy settings are retrieved when the current location information of the mobile terminal (i.e. associated to called party) is different from location information associated with the network server i.e. when the mobile terminal is in visitor network. In an embodiment, the processor 304 routes the call to the network server i.e. home network for announcing the pre-stored information in the predefined language to the telecom equipment based on the privacy settings. Various functionalities performed by the processor 304 are achieved using one or more modules that are stored in the memory 306 which are explained in below description.

The memory 306 stores instructions which are executable by the at least one processor 304. In an embodiment, the memory 306 stores network server data 402, language data 404, device data 406, privacy settings 408 and other data 410. In an embodiment, the network server data 402, the language data 404, the device data 406, the privacy settings 408 and other data 410 are stored as one or more data required for concealing the current location information of the user (i.e. called party) to the calling party as described in the following description of the disclosure.

Figure 4:
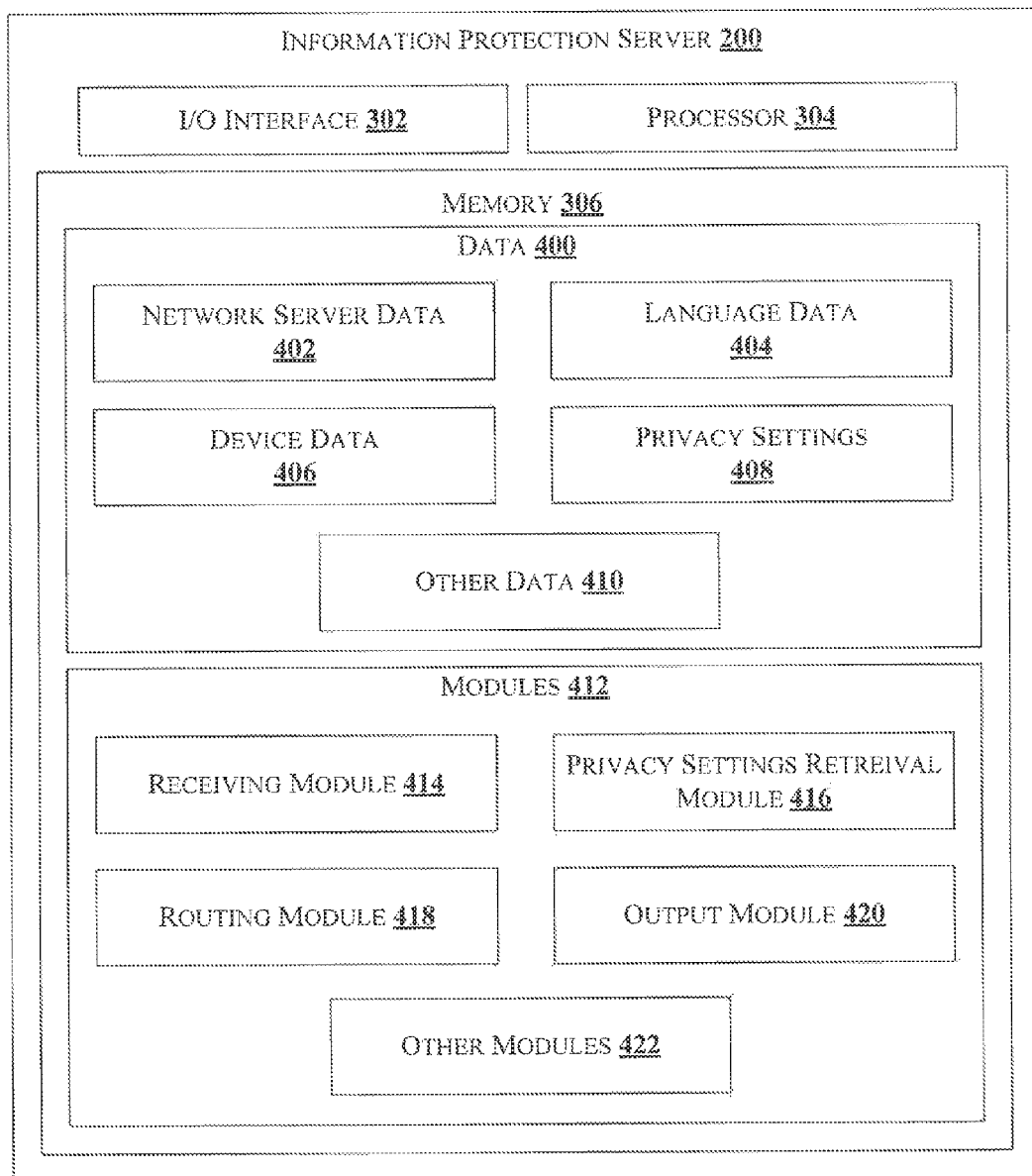
FIG. 4 illustrates a block diagram of an exemplary information protection server with various data and modules for concealing location information of a called party in accordance with some embodiments of the present disclosure.

FIG. 4 illustrates a block diagram of the exemplary information protection server 200 with various data and modules for concealing the current location information of the user in accordance with some embodiments of the present disclosure. In the illustrated FIG. 4, the one or more data 400 and the one or more modules 412 stored in the memory 306 are described herein in detail.

In an embodiment, the one or more data 400 may include, for example, the network server data 402, the language data 404, the device data 406, the privacy settings 408 and other data 410 for concealing the current location information of the user.

The network server data 402 refers to information relating to the network server i.e. the network_1 206 and the network_2 212. Particularly, location of the network server, network name, speed of the network server along with the pre-stored information of the network server is included in the network server data 402.

The language data 404 refers to kind of language configured for the particular location of the network server (network_1 206 and the network_2 212). For example, consider the network_1 206 is configured for "First" state and hence the predefined language for the network_1 206 is set to "First" language. Similarly, consider the network_2 212 is configured for "Second" state and hence the predefined language for the network_2 212 is set to "Second" language.

The device data 406 refers to details of the mobile terminal and/or the telecom equipment. The device data 406 refers in particular refers to SIM details, prepaid account details, contact list stored in the mobile terminal and/or the telecom equipment etc.

The privacy settings 408 refer to settings related to concealing of the current location information of the user (i.e. called party) to the calling parties which are stored in database contained in the information protection server 200.

In an embodiment, the user is facilitated to set the preferred location announcement as privacy settings based on the location and/or the users who are the calling parties. The user i.e. called party can activate the privacy settings whenever wishes to use the privacy settings. In an example, the privacy settings can be activated by providing facility code which is a code to activate the privacy settings along with Personal Identification Number (PIN) and list of user's numbers. The list of user's numbers and other profile data of each user is obtained from the corresponding MSC of the network server associated to the user i.e. called party who wishes to use the privacy settings. Table 1 below shows the facility or privacy settings for various calling parties:

TABLE 1

| Subscriber | Phone Number | Facility of Privacy Settings | Announcement |
| --- | --- | --- | --- |
| User 2 | 123456567 | ON | Private Announcement |
| User 5 | 236752894 | OFF | Original Announcement |
| User 6 | 824682602 | ON | Private Announcement |

In table 1, 'ON' state illustrates activation of the privacy settings for user 2 and user 6 for whom the busy state or not reachable state of user 1 is announced in the language configured with the home network. 'OFF' state illustrates deactivation of the privacy settings for user 5 for whom the announcement is played in a language configured with the visitor network. For example, user 1 may have set privacy settings for user 2, and user 6 etc. Thus, whenever the user 1 is roaming and is in visitor network and same time when the user 2 or user 6 calls user 1, particularly, the busy or not reachable state of the user 1 is announced in the language predefined for the home network of the mobile terminal of the user 1 so that the user 2 or user 6 cannot identify or determine the current location information of the user 1.

The other data 410 may refer to such data which can be referred for concealing the current location information of the user (i.e. called party) to the calling parties.

In an embodiment, the one or more data 400 in the memory 306 are processed by the one or more modules 412 of the information protection server 200. The one or more modules 400 may be stored within the memory 306 as shown in FIG. 4. In an example, the one or more modules 412, communicatively coupled to the processor 304, may also be present outside the memory 306 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 412 may include, for example, a receiving module 414, a privacy settings retrieval module 416, a routing module 418 and an output module 420. The memory 306 may also comprise other modules 422 to perform various miscellaneous functionalities of the information protection server 200. It will be appreciated that such aforementioned modules may be represented as a single module or a combination of different modules.

The receiving module 416 receives the current location information of the mobile terminal associated with the user i.e. called party from the network server i.e. visitor network.

The current location information of the mobile terminal is received from the MSC associated with the network server i.e. visitor network by referring to the VLR of the visitor network. In an embodiment, the current location information is received when the call is initiated by the telecom equipment of the calling party with the mobile terminal of the user. For example, considering the mobile terminal_1 202 is associated with user 1 and the telecom equipment can be mobile terminal_2 204 that is associated with user 2. Now, considering, user 2 is calling user 1 who is busy or is not reachable. Further, assuming, the mobile terminal_1 202 is roaming and is present within visitor network, say, network_2 212 that is associated with "Second" state. In such a case, the current location information of the mobile terminal_1 202 associated with user 1 is received from network_2 212 by referring to the VLR_2 216 of the network_2 212.

The privacy settings retrieval module 416 retrieving the privacy settings of the mobile terminal that is predefined in respect to the telecom equipment when the current location information of the mobile terminal is different from location information associated with the network server. Particularly, when the current location information is the visitor location information, then the privacy settings retrieval module 416 retrieves the privacy settings of the calling party from the database storing the privacy settings for each calling party in the information protection server 200. For example, considering the user 1 has set the privacy settings for user 2. In such a case, the privacy settings for user 2 calling the user 1 are retrieved from the database of the information protection server 200.

The routing module 418 routes the call back to the network server i.e. home network of the user (called party) for announcing the pre-stored information in the predefined language to the telecom equipment (calling party) based on the retrieved privacy settings for concealing the current location information of the user. For example, the call from user 2 is routed back to home network of mobile terminal_1 202 which is network_1 206. The MSC_1 208 of the network_1 206 routes the call to the media player or the announcement player of the network_1 206 so that the pre-stored information i.e. busy state of the mobile terminal_1 202 is announced in "First" language which is configured with the network_1 206. In an embodiment, the announcement is provided in form of voice announcements. In an embodiment, the routing is performed using the output module 420. In an embodiment, the language of the announcements can be changed as per user convenience depending on the location and the calling parties. In an embodiment, the announcements are played depending on various conditions. The conditions include, but are not limited to, rerouting of the call from the calling party is activated, the call is received from same network carrier and/or different carrier, routing settings/agreements, session of the call from the calling party is still active and/or billing information of the user i.e. called party is accurate and sufficient. In an embodiment, rerouting of the call is activated because hops to different network consume extra resources and is tedious. The call received from same network carrier involves hopping the calls to same network where resource utilization is not chargeable. The call received from the different carrier then every hop is charged by other operator towards source operator which in turn increases the cost of the call which may be not acceptable by the user. The activeness of the session of the call from the calling party involves providing announcement till the time the call is terminated by the calling party. As the call is hung up then no announcement is played. The billing information of the user i.e. called party is accurate and sufficient involves facilitating the usage of the privacy settings only when the user has sufficient balance for using the facility for concealing the privacy.

Figure 5:
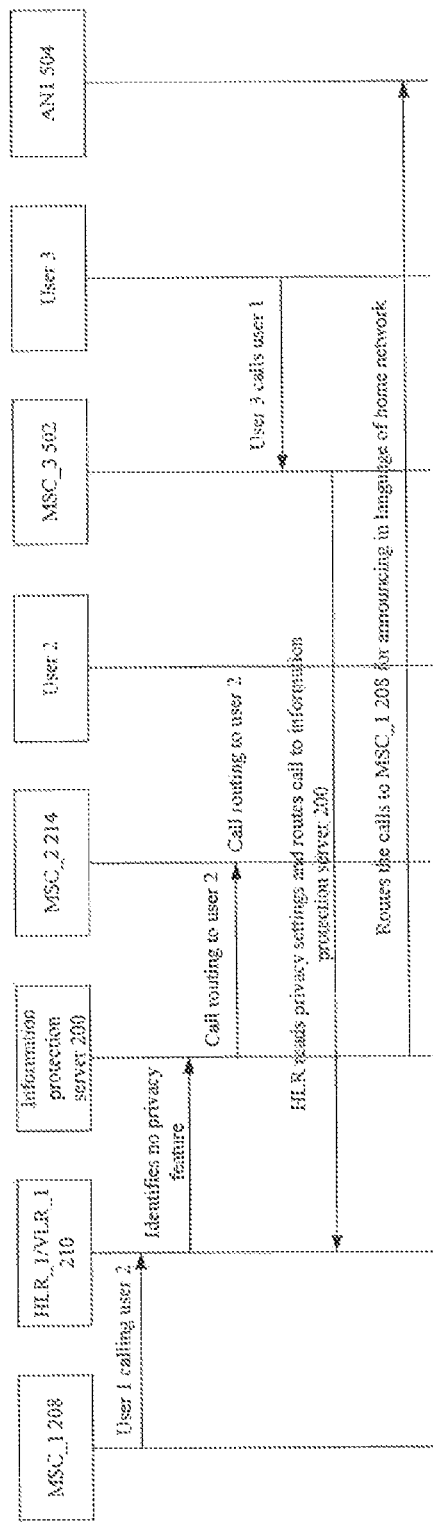
FIG. 5 shows an exemplary state diagram illustrating routing of call for announcing pre-stored information in a predefined language of home network in accordance with some embodiments of the present disclosure.

FIG. 5 shows the state diagram for routing the call for concealing the current location information of the user (called party) in accordance with some embodiments of the present disclosure. In the illustrated FIG. 5, user 1 calls user 2, here user 1 is the calling party and user 2 is the called party. The call is routed through MSC_1 208. The information protection server 200 identifies that there is no privacy features set for the user 1 by the user 2. Hence, the HLR_1/VLR_1 210 is routed to user 2 through MSC_2 214. In the same time, user 3 tries to reach user 1 who is in roaming in network area of user 2. Then, the information protection server 200 identifies that there is a privacy setting for the user 3 by the user 1. Thus, the call is routed by the MSC_1 208 along with the announcement in the language set for the MSC_1 208 to the MSC_3 of the user 3.

Figure 6:
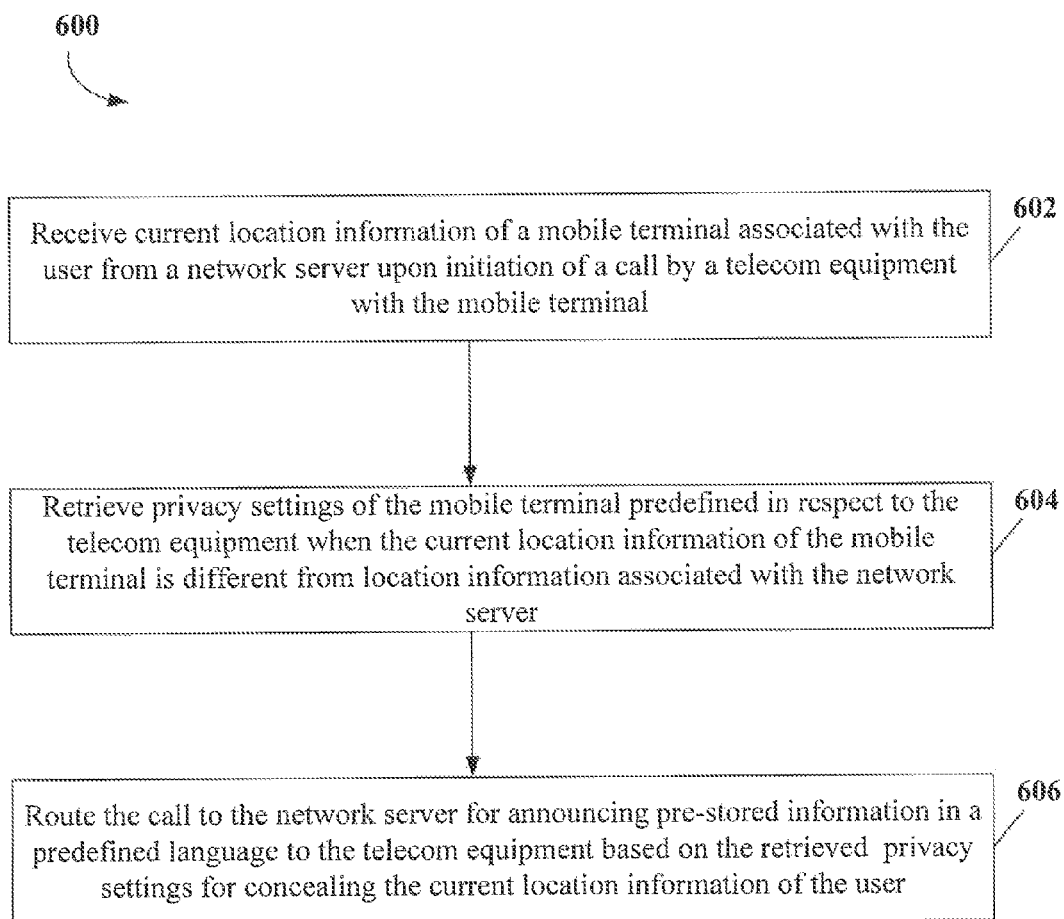
FIG. 6 shows a flowchart illustrating a method concealing location information of a called party in accordance with some embodiments of the present disclosure.

FIG. 6 shows a flowchart illustrating a method 600 for concealing the current location information of the user to any calling party in accordance with some embodiments of the present disclosure.

As illustrated in FIG. 6, the method comprises one or more blocks for concealing the current location information of the user to any calling party. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method 600 can be implemented in any suitable hardware, software, firmware, or combination thereof.

At block 602, the current location information of the mobile terminal associated with the user from the network server i.e. visitor network is received upon initiation of a call by the telecom equipment with the mobile terminal. The mobile terminal is registered with the network server. In an embodiment, the current location information of the mobile terminal is received from the Mobile Switching Centre (MSC) associated with the network server using the location register of the MSC.

At block 604, the privacy settings of the mobile terminal predefined in respect to the telecom equipment is retrieved when the current location information of the mobile terminal is different from location information associated with the network server. In an embodiment, the privacy settings are stored in the database associated with the information protection server 200.

At block 606, the call is routed to the network server for announcing the pre-stored information in the predefined language to the telecom equipment based on the retrieved privacy settings for concealing the current location information of the user. In an embodiment, the predefined language contains the language pre-set with the home network server of the MSC. The predefined information is stored in the network server and is provided by the network server in a form of voice announcements to the telecom equipment. In an embodiment, the predefined language can be changed depending on the current location information, and/or the telecom equipment.

Computer System

Figure 7:
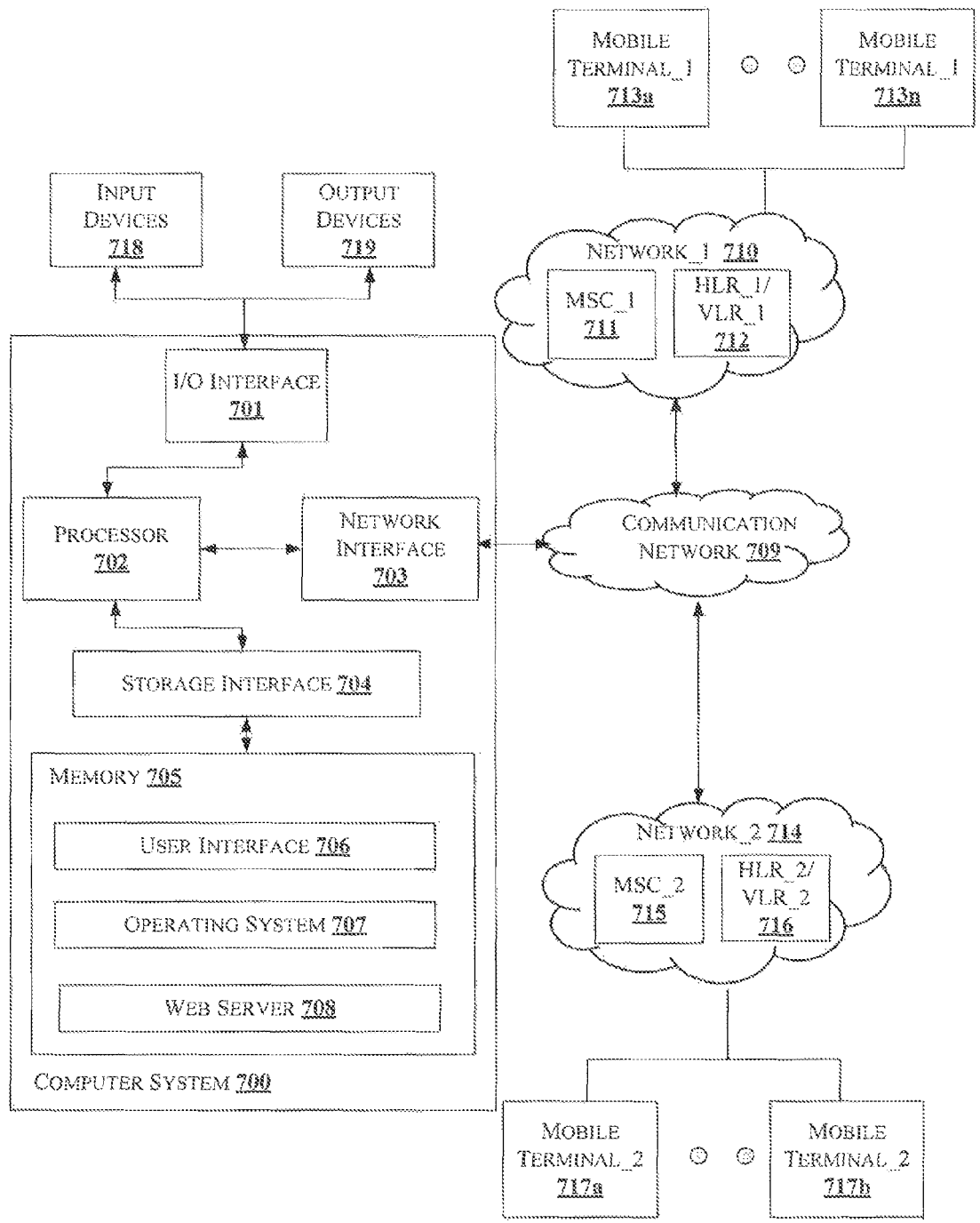
FIG. 7 is a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the information protection server 200. The computer system 700 may comprise a central processing unit ("CPU" or "processor") 702. The processor 702 may comprise at least one data processor for executing program components for executing server generated location information and/or the privacy settings. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the network servers such as network_1 710 and network_2 714 having MSC_1 711 and HLR_1/VLR_1 712 and MSC_1 715 and HLR_1/VLR_1 716 through a communication network 709. Each network server is connected to mobile terminals 713a, . . . , 713n and 717a, . . . , 717n respectively as shown in FIG. 7. The processor 702 may be disposed in communication with the communication network 709 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 703 and the communication network 709, the computer system 700 may communicate with the network_1 710 and network_2 714. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The communication network 709 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 909 may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as the data, variables, records, etc. as described in this disclosure. Such databases may be implemented as fault-tolerant, relational, scalable, secure databases such as Oracle or Sybase.

The operating system 707 may facilitate resource management and operation of the computer system 700. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 700 may implement a web browser 707 stored program component. The web browser 708 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX, DHTML, Adobe Flash, JavaScript, Java, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 900 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present facilitate user i.e. the called party to set the privacy settings for a particular calling party in the language that the user wish.

Embodiments of the present disclosure conceal the privacy information of the called party to any calling party. In such a way, the calling party cannot identify or determine the current location of the called party.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

| Referral Numerals | |
|---|---|
| Reference Number | Description |
| 200 | Information Protection Server |
| 202a . . . , 202n | Mobile Terminal_1 |
| 204a, . . . , 204n | Mobile Terminal_2 |
| 206 | Network_1 |
| 208 | Mobile Switching Centre (MSC)_1 |
| 210 | Home Location Register (HLR)_1/Visitor Location Register (VLR)_1 |
| 212 | Network_2 |
| 214 | Mobile Switching Centre (MSC)_2 |
| 216 | Home Location Register (HLR)_2/Visitor Location Register (VLR)_2 |
| 302 | I/O Interface |
| 304 | Processor |
| 306 | Memory |
| 400 | Data |
| 402 | Network Server Data |
| 404 | Language Data |
| 406 | Device Data |
| 408 | Privacy Settings |
| 410 | Other Data |
| 412 | Modules |
| 414 | Receiving Module |
| 416 | Privacy Settings Retrieval Module |
| 418 | Routing Module |
| 420 | Output Module |
| 422 | Other Modules |
| 700 | Computer System |
| 701 | I/O Interface |
| 702 | Processor |
| 703 | Network Interface |
| 704 | Storage Interface |
| 705 | Memory |
| 706 | User Interface |
| 707 | Operating System |
| 708 | Web Server |
| 709 | Communication Network |
| 710 | Network_1 |
| 711 | MSC_1 |
| 712 | HLR_1/VLR_1 |
| 713a, . . . , 713n | Mobile Terminal_1 |
| 714 | Network_2 |
| 715 | MSC_2 |
| 716 | HLR_2/VLR_2 |
| 717a, . . . , 717n | Mobile Terminal_2 |
| 718 | Input Devices |
| 719 | Output Devices |

What is claimed is:

1. A method for concealing location information of a user, the method comprising:
receiving, by an information protection server, from a network server, current location information of a mobile terminal associated with the user, wherein the receiving is upon initiation of a call by a telecom equipment with the mobile terminal, wherein said mobile terminal is registered with the network server;
retrieving, by the information protection server, privacy settings of the mobile terminal with respect to the telecom equipment, when the current location information of the mobile terminal is different from location information associated with the network server; and
routing, by the information protection server, the call to the network server, wherein the routing of the call causes the network server to announce pre-stored information in a predefined language to the telecom equipment based on the retrieved privacy settings for concealing the current location information of the user.

2. The method as claimed in claim 1, wherein the current location information of the mobile terminal is received from at least one Mobile Switching Centre (MSC) associated with the network server using at least one location register of the MSC.

3. The method as claimed in claim 2, wherein the predefined language comprises language pre-set with the network server of the MSC.

4. The method as claimed in claim 3, wherein the pre-stored information is stored in the network server.

5. The method as claimed in claim 1, wherein the pre-stored information is provided by the network server in a form of voice announcements to the telecom equipment.

6. The method as claimed in claim 1, wherein the privacy settings are stored in a database associated with the information protection server.

7. The method as claimed in claim 1 further comprising changing by the information protection server, the predefined language depending on at least one of the current location information, and the telecom equipment.

8. An information protection server for concealing location information of a user, comprising:
a processor;
a memory communicatively coupled to the processor, wherein the memory stores processor-executable instructions, which, on execution, cause the processor to:
receive, from a network server, current location information of a mobile terminal associated with the user, wherein the receiving is upon initiation of a call by a telecom equipment with the mobile terminal, wherein said mobile terminal is registered with the network server;
retrieve privacy settings of the mobile terminal with respect to the telecom equipment, when the current location information of the mobile terminal is different from location information associated with the network server; and
route the call to the network server, wherein the routing of the call causes the network server to announce pre-stored information in a predefined language to the telecom equipment based on the retrieved privacy settings for concealing the current location information of the user.

9. The information protection server as claimed in claim 8, wherein the current location information of the mobile terminal is received from at least one Mobile Switching Centre (MSC) associated with the network server using at least one location register of the MSC.

10. The information protection server as claimed in claim 9, wherein the predefined language comprises language pre-set with the network server of the MSC.

11. The information protection server as claimed in claim 10, wherein the pre-stored information is stored in the network server.

12. The information protection server as claimed in claim 8, wherein the pre-stored information is provided by the network server in a form of voice announcements to the telecom equipment.

13. The information protection server as claimed in claim 8, wherein the privacy settings are stored in a database associated with the information protection server.

14. The information protection server as claimed in claim 8, wherein the processor is further configured to change the predefined language depending on at least one of the current location information, and the telecom equipment.

15. A non-transitory computer readable medium including instructions stored thereon that when processed by a processor cause an information protection server for concealing location information of a user to perform acts of:

receiving, from a network server, current location information of a mobile terminal associated with the user, wherein the receiving is upon initiation of a call by a telecom equipment with the mobile terminal, wherein said mobile terminal is registered with the network server;

retrieving privacy settings of the mobile terminal with respect to the telecom equipment when the current location information of the mobile terminal is different from location information associated with the network server; and routing the call to the network server, wherein the routing of the call causes the network server to announce pre-stored information in a predefined language to the telecom equipment based on the retrieved privacy settings for concealing the current location information of the user.

16. The medium as claimed in claim 15, wherein the current location information of the mobile terminal is received from at least one Mobile Switching Centre (MSC) associated with the network server using at least one location register of the MSC.

17. The medium as claimed in claim 16, wherein the predefined language comprises language pre-set with the network server of the MSC.

18. The medium as claimed in claim 17, wherein the pre-stored information is stored in the network server.

19. The medium as claimed in claim 15, wherein the pre-stored information is provided by the network server in a form of voice announcements to the telecom equipment.

20. The medium as claimed in claim 15, wherein the privacy settings are stored in a database associated with the information protection server.

21. The medium as claimed in claim 15, wherein the instructions further cause the processor to perform operations comprising changing the predefined language depending on at least one of the current location information, and the telecom equipment.

* * * * *